United States Patent Office 3,421,139
Patented Jan. 7, 1969

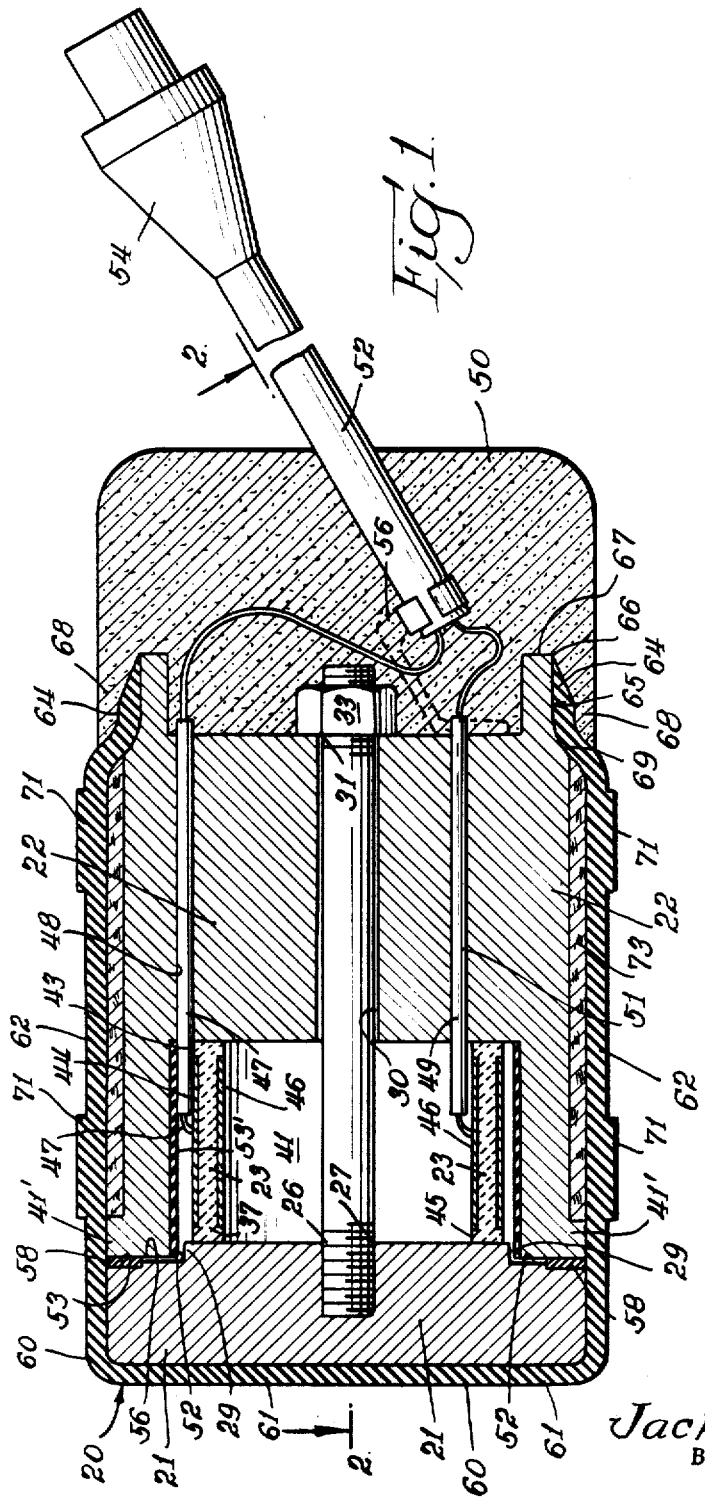
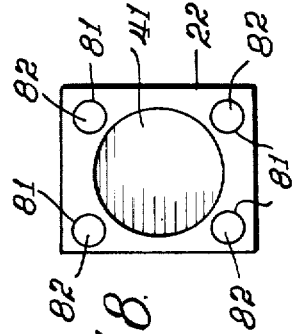
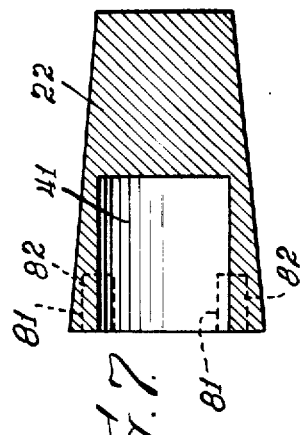
INVENTOR.
Jack Alan Siebert

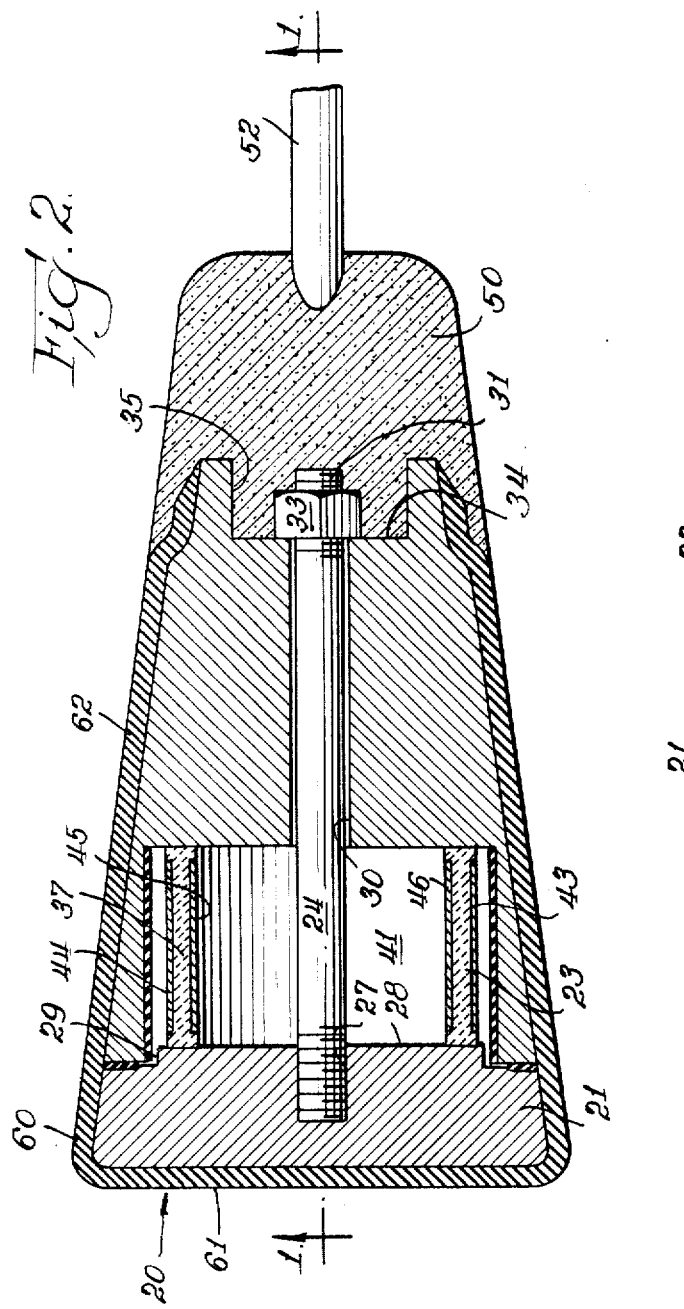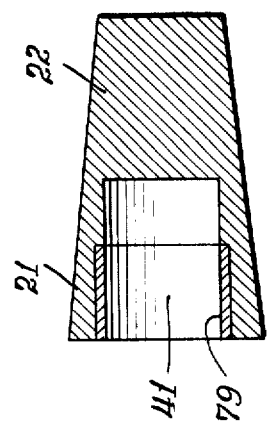

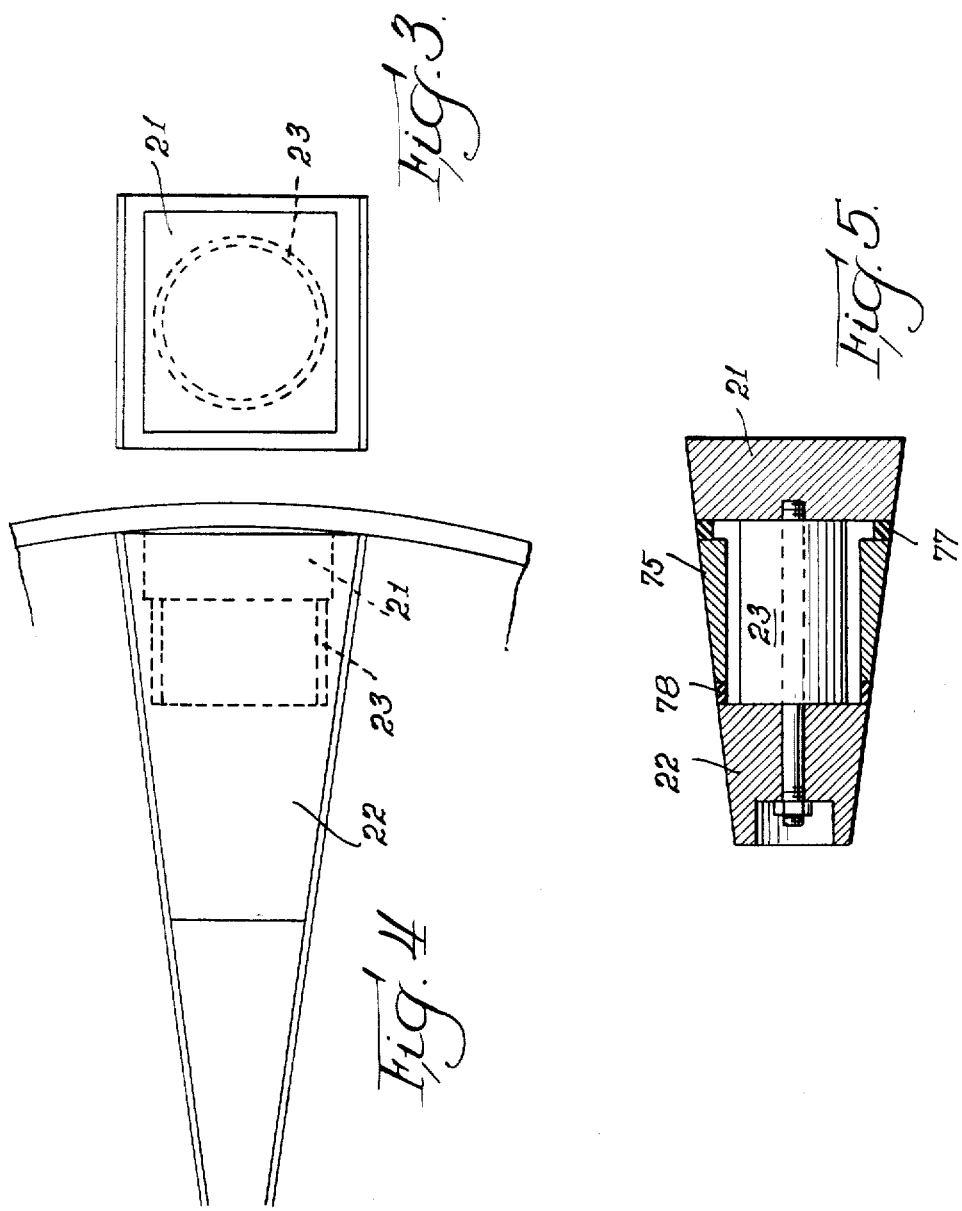

3,421,139
ACOUSTIC TRANSDUCERS
Jack Alan Siebert, Springfield, Ill., assignor to Sangamo Electric Company, Springfield, Ill., a corporation of Delaware
Filed Aug. 23, 1966, Ser. No. 574,389
U.S. Cl. 340—10      5 Claims
Int. Cl. H04b 13/00

ABSTRACT OF THE DISCLOSURE

A device for transmitting and receiving compressional wave energy under water including a front vibrator mass, a rear vibrator mass having an end portion disposed in proximate relation to an end portion of the front mass and having a recess therein adjacent the front mass, a piezoelectric element supported within the recess and having end portions in abutting relation with the front and rear viabrator masses, and means joining the front and rear vibrator masses to provide a sealed housing for the piezoelectric element, the ratio of the masses of the front and rear vibrators being such that the front vibrator mass serves as the effective radiator and receiver of the device.

---

The present invention relates to acoustic transducers generally, and more specifically to transducers for transmitting and receiving compressional wave energy underwater.

Devices of this type are generally operative to convert electrical energy into compressional wave energy in the transmitting phase of their cycle, and to convert compressional wave energy back into electrical energy in the receiving phase of their cycle. In use with underwater equipment, as for example a sound echo ranging system, the transducers are operative to transmit and receive acoustic wave energy in establishing the location of underwater objects.

Heretofore, prior transducers of this general type have utilized separate, exterior cases or housings to enclose an active piezoelectric element which is electrically vibrated to provide compressed wave energy output during the transmitting phase. These housings must contain mounting provisions for the vibrating assembly which provide acoustical, mechanical, and electrical isolation from the housing. This is usually done by attaching or securing the assembly to the housing through a rubber or cork medium, or possibly a compressed stack of paper. Mounting arrangements which provide sufficient acoustic isolation generally do not provide adequate support for the vibrator during conditions of severe shock and vibration. The vibrator is often sealed into the housing by means of O rings or molded gaskets, or often the radiating faces of the vibrators include molded rubber or other coverings which extend to bond or clamp to the housing structure. Electrical connections must also be brought out from within the case, thereby requiring cables, glands or other fittings, or some form of encapsulated cable exit. The housing or case itself must be made from a corrosion resistant material or be covered by a protective material such as rubber or plastic.

If the transducer is to operate at more than a few pounds per square inch of hydrostatic pressure, the case and vibrator mounting become increasingly complex. In the past, attempts have been made to secure satisfactory performance by employing appropriately rugged components and filling the case with an acoustically compatible dielectric oil to distribute the pressure uniformly throughout. If given areas of the active material or vibrating masses are not intended to radiate, a method of acoustically isolating these areas from the surrounding oil is required. This has been done by applying coatings, sealing off small areas, and numerous other expedients. The resulting structures have been large, heavy, complex and costly, with only marginal reliability.

The complexity of the units is of course reflected in the manufacture and maintenance of the transducers, since complex construction techniques such as those described must result in increased manufacturing costs. Further, numerous seals, connections, and critical tolerances in the long run must adversely affect reliability. It is a specific object of the present invention, therefore, to provide a simple, reilable, low cost transducer which eliminates complex construction techniques.

It is a further object of the present invention to provide a novel transducer element for use as either a projector or hydrophone which fulfills all of the requirements for a transducer without requiring a separate element housing.

It is another object of the invention to provide a construction in which the mass loading of the rear vibratory mass may be readily altered to adjust the Q and resonant frequency of the total assembly.

It is a specific object of the present invention to provide a transducer in which the two vibrator masses in addition to their functional purposes as vibrators also serve as the protective enclosure for the active elements.

More specifically, one of the main objects or features of the invention resides in the manner of enclosing or housing the piezoelectric element in each transducer assembly. The entire transducer assembly of the invention comprises three main elements, to wit: (1) a front or outer vibrator mass which transmits and receives the compressional wave energy sent from and received by the transducer unit; (2) a rear or inner vibrator mass located at the rear or inner end of the transducer and functioning as a counter-vibrator to the front vibrator mass; and (3) a piezoelectric motor unit between the front and rear vibrator masses. The front and rear vibrator masses define therebetween an enclosure or housing within which the piezoelectric unit is enclosed. This avoids the necessity of any separate enclosure or housing for enclosing the piezoelectric unit. The advantages of such arrangement are multifold. Initially, such structure insures a direct and intimate contact between the front and rear ends of the piezoelectric unit and the front and rear vibrator masses of the transducer assembly. Additionally, the elimination of the separate housing member makes possible the more efficient use of the minimum space which is normally available in such structures. The number and complexity of the transducer element components are reduced considerably which results in maximum reliability at minimum cost from both a manufacturing and a maintenance standpoint. Of special import, the resultant structure performs consistently and reliably at varying pressures without the requirement for complex pressure mountings, oil fittings and critical seals.

These and other objects, advantages and features of the invention will be apparent to those skilled in the art from the following detailed description, taken in conjunction with the accompanying drawings, in which:

FIGURE 1 is a vertical sectional view of one embodiment, taken approximately on the plane of the line 1—1 of FIGURE 2;

FIGURE 2 is a vertical sectional view of the same taken approximately on the plane of the line at 2—2 of FIGURE 1;

FIGURE 3 is a front or outer elevational view showing the radiating face of the transducer;

FIGURE 4 is a fragmentary horizontal sectional view looking down upon a plurality of transducers arranged in their drum-like assembly of vertical columns or staves;

FIGURE 5 is a sectional view of a further embodiment of the transducer in which the portion enclosing the motor is isolated from both the radiating and counter mass;

FIGURE 6 is a horizontal sectional view of a modified construction illustrating one method of increasing the mass loading of the cavity in the rear vibratory member;

FIGURE 7 is a longitudinal sectional view showing another method of increasing the mass loading around the cavity in the rear vibrating member; and FIGURE 8 is an end view of the latter.

Referring first to FIGURES 1, 2 and 3, the transducer unit, designated 20 in its entirety, comprises a front or outer mass 21, a rear or inner mass 22, and an intermediate driving element or motor 23 disposed therebetween. The end masses 21, 22 act as weights, and the motor element 23 acts as a spring to form a vibrating assembly. In this arrangement the front end mass is utilized as the radiating surface and the rear mass is used as a countermass to adjust the Q and, along with the motor characteristics, establish the resonant frequency of the total assembly. A bias rod 24 extends centrally of the front mass 21, rear mass 22 and driving element 23, which rod serves to secure them altogether and also serves as a biasing rod operative to apply a constant endwise pressure against the opposite ends of the piezoelectric motor element 23. The front end of this rod is threaded at 26 for screwing into the tapped hole 27 entering the innerface 28 of a circular boss 29 projecting rearwardly from the back side of the front mass 21. The rear portion of the rod 24 extends freely through a hole 30 in the rear mass 22 and has its rear end threaded at 31 for receiving the biasing nut 33 which screws up against the bottom face 34 of the rear counter-bore 35 in the outer end of the rear mass 22. The front and rear masses 21 and 22 were in one embodiment composed of aluminum, although other materials may be employed as necessary to vary the operating characteristics.

The driving motor element 23 is in the form of a cylindrical sleeve 37 composed of a suitable crystalline material, such as quartz, ceramics, rochelle salts, tourmaline, or the like. This crystalline sleeve is disposed axially within a front counter bore 41 in the front end of the rear mass 22, with its rear end abutting against the inner face of a circular boss 29 which projects rearwardly from the backside of the front mass 21.

Extending around the outer surface 43 of this active piezoelectric sleeve 37 is an outer electrode band 44 for establishing electrical connection with the outer surface of the vibratory material 37; and extending around the inner surface 45 of this cylinder is an inner electrode band 46 for establishing electrical connection with the inner surface of the piezoelectric matrial of the cylinder. These two bands have their front and rear edge terminating just short of the front and rear ends of the piezoelectric motor sleeve 37.

Soldered or otherwise secured to the outer electrode band 44 is an insulated conductor 47 which extends rearwardly through a hole 48 in the rear mass 22 and emerges in a rear counterbore 35. Similarly soldered or otherwise secured to the electrode band 46 is an insulated conductor 49 which also extends rearwardly through a hole 51 in the rear mass 22 and emerges in the rear counterbore 35. These two conductors are embedded in an encapsulated end head 50 composed of an acoustically, electrically, and mechanically suitable encapsulating material. This encapsulating material fills the counter bore 35 and locks the nut 33 against rotation. It also supports a watertight cable (52), to which is molded the connector fitting 54. A cable clamp 56 fastened to the bottom of the counter bore 35 secures the cable 52 at the desired position and angle prior to encapsulation in the end head 50.

Lining the inner wall of the front counter bore 41 and surroduning the outer electrode band 44 and its conductor 47 is an insulating lining cylinder 53'.

The forwardly projecting portion 41' of rear mass 22 extends beyond the edge of the circular boss 29 projecting from the rear of the front mass 21. The end surface of the forwardly projecting sleeve portion 41' of the rear element 22 has a flat face 56. The opposing rear face of the front mass 21 extending outwardly beyond the boss 29 is formed with an inner face 52 and an outer face 53 of different heights. This ledge formed by the faces 52 and 53 serves to locate and retain the compressive gasket 58 interposed between the outer face 53 of the front element 21 and the flat face 56 of the rear element 22 thereby sealing the joint between the front and rear elements 21 and 22. The compression in gasket 58 is determined by the dimensions and tolerances of the front mass 21, rear mass 22, motor 23, and gasket 58.

Extending from the front or outer end of the tranducer assembly is a molded elastic boot 60, preferably composed of a plastic material, such as acoustical neoprene. This is formed with an end head 61 and a skirt portion 62 which extends back over both masses 21 and 22. The forward boot portion is vulcanized to the front radiating mass and the rearward end of the skirt portion is formed with an inwardly deflected taper 64 which causes this tapered portion to seat on the reduced surface 65 at the end of the rear mass 22, this tapered portion 64 being reduced down to a pointed edge 66 at the end surface 67 of the rear mass 22. In the encapsulating operation the encapsulating material is compressed inwardly to form the closing flange 68 which overlies the tapered end of the neoprene boot 60 and holds the latter pressed inwardly into engagement with the sloping surface 69 of the rear mass 22. The encapsulating material is also extended into the counter bore 35 of the rear mass 22 so as to completely embed both conductors 47 and 49 and anchor the bracket fixture 56. The holes 48 and 51 for conductors 47 and 49, as well as hole 30 for bias rod 24 are sealed at the bottom surface 34 of the counterbore 35 prior to encapsulation. Interposed between the flat top and bottom surfaces of the rear mass 22 and the adjacent inner surfaces of the boot 60 are fillings or slabs 73 of cork-neoprene material, which cushion the mounting of the transducer unit.

It will be understood that in conventional underwater use, there are a substantial number of these transducer assemblies stacked vertically in columns or "staves," which columns or staves are arranged circularly around a cylindrical supporting cage, so that the resulting assembly resembles a cylindrical drum adapted for attachment to the hull of a ship, submarine or the like, such mode of use being shown in the U.S. Patent 2,515,154 which is assigned to the assignee of this invention. The top and bottom surfaces of the boot are therefore formed with outwardly projecting locking buttons 71 for securing the transducer unit to upper and lower locking rings which mount the units as more fully disclosed in such patent.

As shown in FIGURES 3 and 4 the front mass 21 and the rear mass 22 are both of a rectangular cross section, with the longer dimension extending vertically. Also, the vertical side surfaces of the front and rear masses are tapered inwardly from front to rear along radial lines so that when assembled in side-by-side abutting contact they will make up a complete ring of transducer units.

Referring to the operation of the transducer unit, in the transmitting phase of the cycle, the signal pulses which are to be transmitted are brought in through conductors 47 and 49 and impressed upon the outer and inner electrode rings 44 and 46. From here they enter the outer and inner surfaces of the piezoelectric motor element 23 and set up vibratory responses in the motor element, which are transmitted from the ends of said motor ring 23 and enter the front mass 21 and the rear mass 22. However, since the ratio of the rear mass is large relative to the front mass 21, the front mass is the effective radiator which sets up compressional vibrations water searching operation or an underwater signalling in the surrounding sea water as, for example, in an under-operation. With both masses exposed to the medium a very linear output is obtained at all levels of hydrostatic pressure within the design limits of the motor 23.

In the reverse phase of receiving underwater signals, the compressional waves being transmitted through the water act on the front mass 21 and on the rear mass 22 to set up corresponding vibrations therein. These are transmitted in turn to the front and rear ends of the piezoelectric sleeve 23. The compressional waves acting on the piezoelectric sleeve 23 set up corresponding currents generated within the crystal which are transmitted out through the conductors 47 and 49 in the form of electric currents of corresponding vibratory nature.

As will be apparent from such description this novel embodiment acknowledges all of the requirements for a transducer to operate either at a modest or considerable level of hydrostatic pressure, and yet it does not require an element housing. The front and rear vibrator masses effectively serve to transmit and receive vibrations, and they also serve as the protective enclosure for the active piezoelectric element. Any spurious vibrations in the shell which may occur can be damped or moved out of the frequency range of interest by employing an insert of different material. In addition, the cavity provided in the rear vibrator mass provides both the electrical isolation required and also prevents radiation from the surfaces of the ceramic element and interior surfaces of the masses. The radiation to the rear is minimized by maintaining a sufficient ratio of rear to front mass (approximately 2, or greater as required). The masses and/or protective boot are made from a material compatible with the surrounding medium (such as sea water), and the encapsulation material is chosen to closely match the impedance of water, and does not alter the electro-acoustical behavior of the transducer. Gaskets provided between the masses serve to prevent the medium or the rubber boot from being forced into the space between the masses under hydrostatic pressure. Both the front and rear masses cary grooves to locate the gasket and prevent it from entering the interior cavity.

The active material is chosen and configured to obtain the desired power level and to withstand and operate at the required hydrostatic pressure, since the active element sees this pressure in the form of axial compressional s'ress. The bias rod 24 is operative to compressionally bias the active element for high power operation at low hydrostatic pressure. Variation of the physical dimensions can be effected to achieve operation at almost any frequency. Likewise variation of the motor configuration and the seal between the masses may be used to effect operation at different pressures. This construction also avoids the prior problem of selecting and providing a pressure release system to be used in making up the separate housing for separately enclosing the piezoelectric vibrator, which housing could withstand the above stated pressures and provide the required isolation and linear operation. This problem is avoided because in the present construction there is no requirement for any such separate housing, since in this new construction the piezoelectric transducer is housed by the front and rear vibratory masses. In addition, the subsequent elimination of the requirement for compliant watertight seals and pressure release mechanisms enhances the ability of the transducer to withstand impulse shock waves and vibrational environments.

The stated object wherein a separate housing element is not required is also achieved in a structure which utilizes an intermediate joining section which is isolated acoustically from the front and rear masses. More specifically, with reference to FIGURE 5, there is shown thereat a modified construction in which that part of the element enclosing the piezoelectric motor is isolated from both the radiating front mass 21 and the rear counter mass 22. In this construction, the piezoelectric motor 23 is enclosed in an outer shell 75 which has its ends substantially isolated from the front mass 21 and rear mass 22 by compressible gaskets 77 and 78 composed of rubber or some like synthetic compressible material. A neoprene boot may be used therewith as in the previous embodiment.

FIGURE 6 illustrates a modified construction which provides for mass loading of the front cavity 41 to lower the resonant frequency thereof. As there shown, a cylinder or sleeve 79 composed of brass, steel or any other suitable material for mass loading, is inserted into the forward end of the cavity 41. The sleeve may be banded, pressed or cast in place. Variation of the length of the cylinder effects corresponding variation of the mass loading.

Another method of mass loading the cavity 41 is to insert weights in the corners of the rectangular rear mass 22. As shown in FIGURES 7 and 8, insert cavities 81 are provided in the four corners of the rear mass 22. In effecting a greater mass loading, slugs 82 of a material of greater weight than the mass material removed are inserted. Reduced mass loading can be achieved by leaving the cavities 81 vacant, thereby raising the main cavity and/or element resonant frequency.

Although the motor configuration shown comprises a single cylinder, it will be apparent that a number of different motor configurations may be used, and the particular motor design employed is not to be construed as being limiting of the invention scope.

While I have illustrated and described what I regard to be the preferred embodiment of the invention, it will nevertheless be understood that such is merely exemplary, and that numerous modifications and rearrangements may be made therein without departing from the invention.

What is claimed is:

1. A double mass loaded piezoelectric transducer, comprising vibratory front and rear masses having end portions in proximate relation, said rear mass being of greater magnitude than said front mass such that said front mass serves as the effective radiator and receiver of the transducer, said rear mass having a recess therein adjacent said front mass and defined by a rigid annular wall, a piezoelectric element fully disposed within said recess in spaced relation to said annular wall and having end portions abutting said masses for establishing a vibration transmitting and receiving coupling therebetween, means including a biasing member for joining said masses to one another to provide a sealed housing for said piezoelectric element, said biasing member being adjustable to vary the biasing pressure on said piezoelectric element, and a pliable elastic boot enveloping said masses.

2. A double mass loaded piezoelectric transducer as defined in claim 1 wherein said biasing member comprises a bolt which passes through one of said vibratory masses and said piezoelectric element and screws into the other of said masses for exerting a variable compression pressure on said piezoelectric element.

3. A double mass loaded piezoelectric transducer as defined in claim 1 wherein the piezoelectric element is in the form of a cylindrical sleeve, and has conductive rings extending around the outside and inside surfaces of said sleeve for connecting the piezoelectric element in a circuit, and circuit means extending through said one mass to the exterior of said housing.

4. A double mass loaded piezoelectric transducer as defined in claim 1 which includes means within said housing for adjusting the loading of one of said masses.

5. A double mass loaded piezoelectric transducer, comprising vibratory front and rear masses, said rear mass being of greater magnitude than said front mass such that said front mass serves as the effective radiator and receiver of the transducer, a separate central section disposed between said masses and having a rigid annular wall defining a central recess, a piezoelectric element disposed within said recess in spaced relation to said annular wall and having opposite ends abutting said masses for establishing a vibration transmitting and receiving coupling therebetween, and means including a biasing member for joining said masses and said central section to provide a sealed housing for said piezoelectric element, said biasing member being adjustable to vary the biasing pressure on said piezoelectric element.

References Cited

UNITED STATES PATENTS

| | | | |
|---|---|---|---|
| 2,164,638 | 7/1939 | Broeze et al. | 340—10 X |
| 2,846,496 | 8/1958 | Baumgartner et al. | |
| 2,925,582 | 2/1960 | Mattei et al. | |
| 2,945,208 | 7/1960 | Samsel | 340—10 |
| 3,068,446 | 12/1962 | Ehrlich et al. | 340—10 X |
| 3,149,301 | 9/1964 | Green | 340—10 X |
| 3,304,534 | 2/1967 | Sykes | 340—10 |

RODNEY D. BENNETT, *Primary Examiner.*

BRIAN L. RIBANDO, *Assistant Examiner.*